Figure 1:
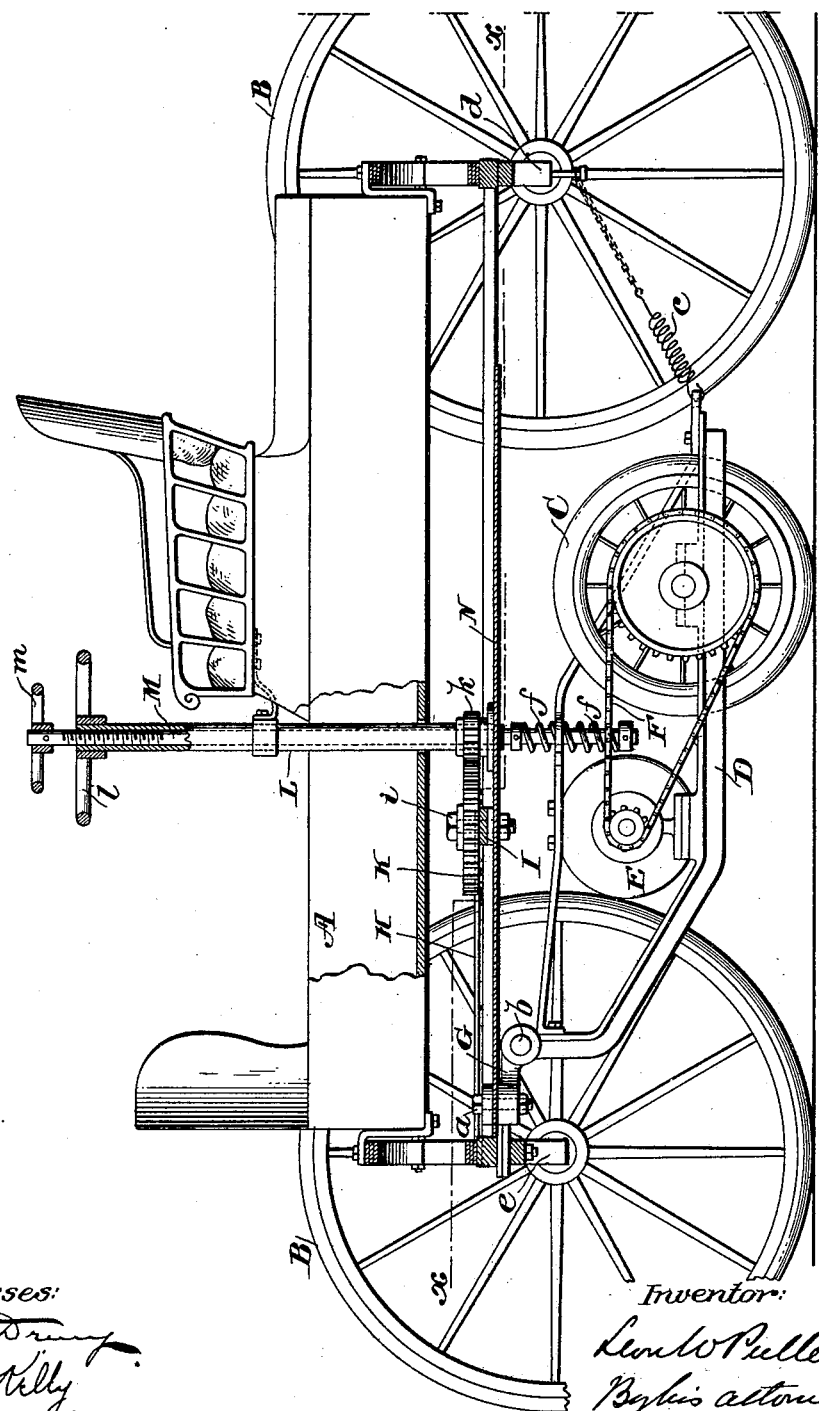

No. 680,074. Patented Aug. 6, 1901.
L. W. PULLEN.
MOTOR VEHICLE.
(Application filed Dec. 27, 1899.)
(No Model.) 2 Sheets—Sheet 1.

Witnesses:
Inventor:

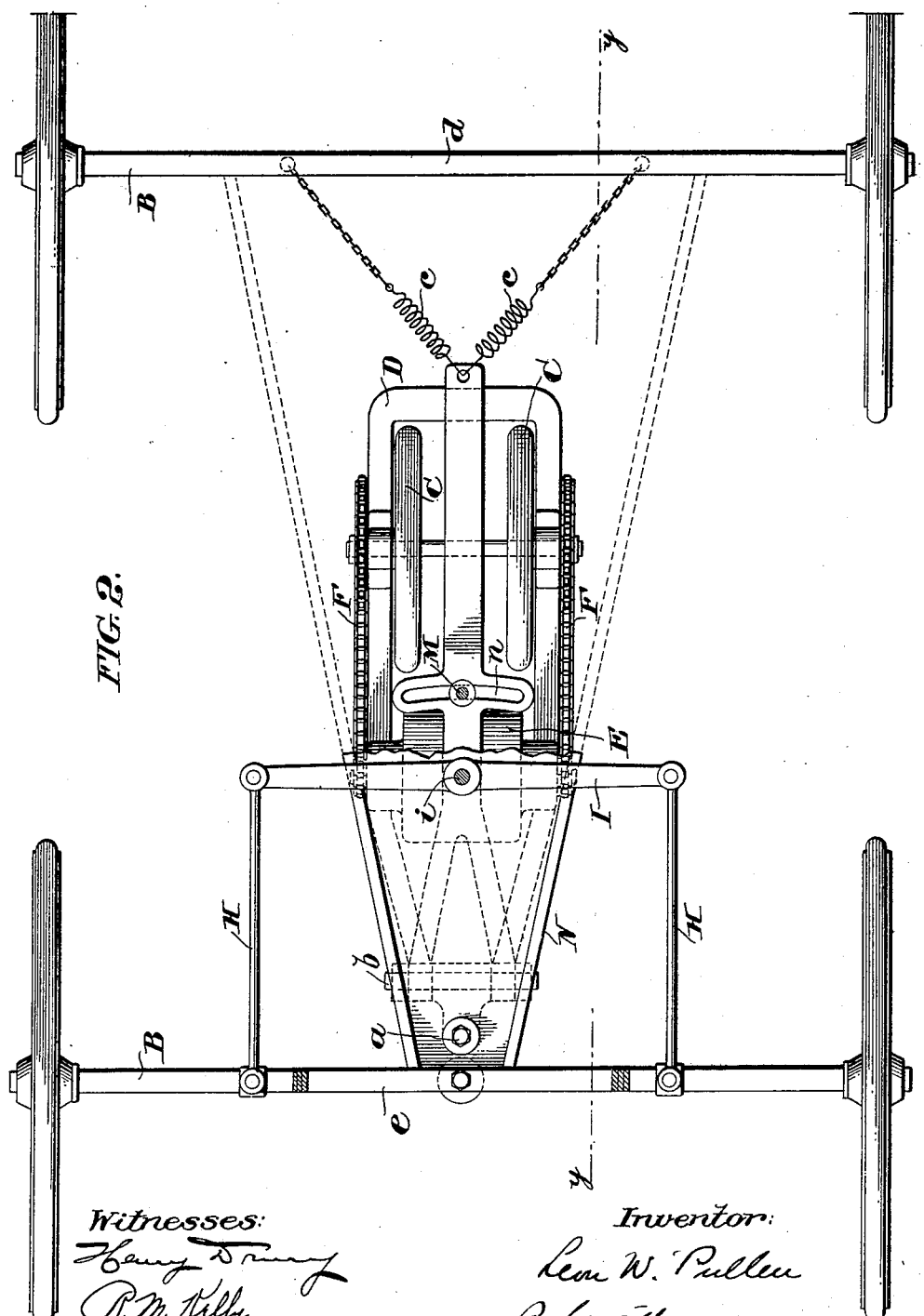

UNITED STATES PATENT OFFICE.

LEON W. PULLEN, OF CAMDEN, NEW JERSEY.

MOTOR-VEHICLE.

SPECIFICATION forming part of Letters Patent No. 680,074, dated August 6, 1901.

Application filed December 27, 1899. Serial No. 741,719. (No model.)

*To all whom it may concern:*

Be it known that I, LEON W. PULLEN, of Camden, county of Camden, State of New Jersey, have invented an Improvement in Motor-Vehicles, of which the following is a specification.

My invention relates to motor-vehicles; and it consists of the improvements which are fully set forth in the following specification and are shown in the accompanying drawings.

More particularly, my invention relates to the driving devices of a motor-vehicle and is designed to enable the vehicle to be driven more easily and economically. Instead of applying the motive power to the wheels of the vehicle I employ an auxiliary traction wheel or wheels independent of the ordinary running-gear and apply the motive power directly to such traction wheel or wheels for the purpose of driving the vehicle. These auxiliary traction-wheels are carried by a frame arranged beneath the vehicle proper and connected therewith with provision for movement both transversely and vertically, which not only enables the traction-wheels to readily accommodate themselves to the irregularities of the road, but also permits their adjustment to regulate the pressure or frictional contact. In my preferred construction this frame is hinged at one end, and its weight (with that of the motor when the motor is carried by it) is sufficient to produce the requisite frictional contact for driving purposes; and my invention embraces means for the adjustment of this hinged or movable frame with facility and while the vehicle is in motion to regulate the frictional contact.

My invention also embraces certain improvements and combination of parts, which are fully set forth hereinafter and are particularly pointed out in the claims.

In the accompanying drawings, Figure 1 is a longitudinal vertical sectional view taken on the line $y\ y$ of Fig. 2 of a motor-vehicle embodying my invention. Fig. 2 is a horizontal sectional plan view of the same on the line $x\ x$ of Fig. 1.

A is the body of the vehicle, carried by the running-gear B in any convenient manner.
C represents auxiliary traction-wheels in addition to the ordinary running-gear, car-
ried by a yielding or movable frame D and running upon the ground.

Any suitable motor E, carried by the frame D, operates the traction-wheels C through the medium of suitable power-transmitting connections F, such as the chains and the sprocket-wheels shown. While I have shown two traction-wheels C, I do not mean to limit myself to that number, as a single traction-wheel may be used or more than two, if desired.

The frame D is pivotally connected with the frame of the running-gear on both vertical and transverse axes $a\ b$. As shown, the front end of the frame D is pivoted on the transverse bolt $b$ to a hinge-leaf G, which is in turn pivoted on the vertical bolt $a$ to a frame N, carried by the running-gear. The frame D is thus connected by a transverse hinge with the vertical pivot $a$, and consequently the frame D may move either laterally or vertically.

The rear end of the frame D is preferably supported from the running-gear by a yielding connection C, such, *e. g.*, as the springs between the frame and the rear axletree.

The steering devices are as follows: The front axletree $e$ is connected by links H H with the ends of a lever I, pivoted on a vertical stud $i$ in a frame N, extending under the vehicle-body and carried by the running-gear. K is a gear-wheel on the pivot $i$, connected with the lever I and engaging a pinion $k$ on the end of a vertical shaft L, extending upward through the car-body and terminating in a hand-wheel $l$ adjacent to the seat. By turning the hand-wheel $l$ the shaft L and its pinion $k$ may be operated to turn the front axletree and the front wheels through the gear K, lever I, and link connections H H.

It is desirable that provision should be made for raising or lowering the motor-frame D to some extent to regulate the pressure of the traction-wheel upon the road. For this purpose the motor-frame is supported beyond the hinge-point $b$ by the upright rod M, by the movement of which the frame D may be raised or lowered. As shown, the rod M extends up through the shaft L and is threaded in engagement with internal threads therein, so that by screwing the rod M up or down, through the medium of a hand-wheel m, the vertical position of the frame D may be adjusted. The frame D is preferably supported by the rod M, through the medium of springs f f, to form a yielding support, and to permit the lateral movements of the frame D with respect to the rod M the latter extends through a segmental slot n in the frame D. When the rod M is screwed down, the tension of the upper spring f upon the frame D is increased, and consequently the frictional contact of the traction-wheels with the ground and their tractive power is increased. When the rod M is screwed upward, the tension of the lower spring f is increased and the tension of the upper spring is decreased, and consequently the frictional contact of the traction-wheels and their tractive power is decreased. Thus the tractive power of the wheels C may be adjusted at will to suit the motive power, load, and grade and while the vehicle is in motion.

I have not shown the devices for operating the motor E, as they form no part of my invention. It is to be understood that any suitable motive power may be used, electric or otherwise, and arranged and connected with the motor E in any suitable manner.

I do not mean to limit myself to the details of construction shown, as it is apparent that they may be varied in many ways without departing from my invention.

What I claim as new, and desire to secure by Letters Patent, is as follows:

1. In a motor-vehicle, the combination with the main body and running-gear, of a frame located below the main body and running-gear and hinged adjacent to the front thereof on both a vertical and horizontal axis, yielding supports for said frame at the rear of said hinge, a traction wheel or wheels carried by said frame, a motor mounted on said frame and operatively connected with said traction wheel or wheels, and means extending above the main body of the vehicle and connected with the yielding supports for the frame in the rear of its hinge to adjust the tension of said supports.

2. In a motor-vehicle, the combination with the main body and running-gear, of a frame located below the main body and running-gear and hinged adjacent to the front thereof on both a vertical and horizontal axis, a traction wheel or wheels carried by said frame, a motor mounted on said frame and operatively connected with said traction wheel or wheels, adjustable devices extending above the main body of the vehicle, and yielding connections between said frame and the adjustable devices located at the rear of the hinge and adapted to have their tension adjusted by said adjustable devices.

3. In a motor-vehicle, the combination with the main body and running-gear, of a frame located below the main body and running-gear and hinged adjacent to the front thereof on both a vertical and horizontal axis, a traction wheel or wheels carried by said frame, a motor mounted on said frame and operatively connected with said traction wheel or wheels, adjustable devices extending above the main body of the vehicle, and yielding connections between said frame and the adjustable devices located at the rear of the hinge and adapted to have their tension adjusted by said adjustable devices and having provision for the lateral movement of said frame on the vertical axis of its hinge.

4. In a motor-vehicle, the combination with the vehicle proper, of an auxiliary frame located beneath the vehicle and connected therewith adjacent to the front on a horizontal axis, a traction-wheel carried by said frame to the rear of its point of connection, a motor operatively connected with said traction-wheel, a hollow steering-shaft, a rod extending through the steering-shaft and connected with said frame at the rear of its horizontal axis, and means for raising and lowering said rod in the hollow steering-shaft to adjust the position of said frame and the traction-wheel carried thereby.

5. In a motor-vehicle, the combination with the main body and running-gear, of a frame supported thereby at its front end with provision for vertical and lateral movement and having a transverse slot n, an adjustable rod M extending through the main body and projecting through said slot n, springs f f between the rod and the transversely and vertically movable frame, a traction wheel or wheels carried by said frame, and a motor operatively connected therewith.

6. In a motor-vehicle, the combination with the vehicle proper, of an auxiliary frame located beneath the vehicle and connected therewith adjacent to the front, and movable upon a transverse axis with reference thereto, a traction-wheel carried by said frame to the rear of its point of connection, the steering-shaft L, the rod M connected with said frame at the rear of its transverse axis, extending upward through the steering-shaft L and in threaded engagement therewith, and the hand-wheel m carried by the rod M for turning it to raise or lower the traction-wheel-carrying frame, and a motor operatively connected with said traction-wheel.

In testimony of which invention I have hereunto set my hand.

LEON W. PULLEN.

Witnesses:
ERNEST HOWARD HUNTER,
J. W. KENWORTHY.